United States Patent [19]

Mori

[11] Patent Number: 4,460,940
[45] Date of Patent: Jul. 17, 1984

[54] APPARATUS FOR UNIFORM ILLUMINATION EMPLOYING LIGHT DIFFUSER

[76] Inventor: Kei Mori, 3-16-3-501, Kaminoge, Setagaya-ku, Tokyo, Japan

[21] Appl. No.: 438,427

[22] Filed: Nov. 2, 1982

[30] Foreign Application Priority Data

Nov. 7, 1981 [JP] Japan .................................. 56-178887
Nov. 11, 1981 [JP] Japan .................................. 56-180761
Nov. 27, 1981 [JP] Japan .................................. 56-189999

[51] Int. Cl.$^3$ .............................................. F21V 7/04
[52] U.S. Cl. ........................................ 362/32; 362/31; 362/268; 362/293; 362/307; 362/308; 362/311; 362/326; 362/330; 362/331; 362/335; 362/336
[58] Field of Search ................... 362/32, 31, 268, 293, 362/307, 308, 311, 326, 330, 331, 335, 336

[56] References Cited

U.S. PATENT DOCUMENTS 3,131,496  5/1964  Schropp ................................ 362/31
3,222,515 12/1965  Orr ..................................... 362/331

Primary Examiner—Stephen J. Lechert, Jr.
Attorney, Agent, or Firm—Jordan and Hamburg

[57] ABSTRACT

A light diffusing device and an illumination apparatus employing the light diffusing device, the light diffusing device including a light transmission element and a light diffusing layer carried on and different in refractive index from the light transmission element, whereby light comes out from the device through the light diffusing layer. A number of such light diffusing layers are arranged in the light diffusing device of the illumination apparatus. The diffusing layers are provided with thicknesses which are different from each other or, otherwise, arranged to a density which varies along the device, thereby illuminating a desired object uniformly as a whole.

15 Claims, 11 Drawing Figures

APPARATUS FOR UNIFORM ILLUMINATION EMPLOYING LIGHT DIFFUSER

BACKGROUND OF THE INVENTION

The present invention relates to a light diffusing device which effectively diffuses a light component of a desired wavelength out of light emitted from a light source and conducted through a light transmission element, so that the desired light component may be exclusively steered to the outside of the light transmission element. The present invention also relates to an apparatus for uniform illumination which employs such a light diffuser.

Light transmission elements are known in various forms as typified by quartz glass fibers, optical fibers made of plastics including acrylic resin and polycarbonate resin, and fine tubes or flat plates constituted by such fibers. Where it is desired to utilize the light propagating through such a light transmission element for illumination purpose, for example, the light has to be diffused to be routed to the outside from the light transmission element.

Meanwhile, light coming out from such light transmission elements is usable to illuminate the dials of various meters installed in audio instruments, automotive vehicles and the like. For such application, the light is required to irradiate the dial of a meter to even intensity over the entire dial surface.

SUMMARY OF THE INVENTION

In one aspect of the present invention, there is provided a light diffusing device comprising a light transmission element for transmitting light emitted from a light source, and a plurality of discrete light diffusing layers positioned at spaced locations on a surface of the light transmission element. Each of the light diffusing layers diffuses and discharges to the outside of the light transmission element only a light component having a specific wavelength which is contained in the light propagating through the light transmission element.

In another aspect of the present invention, an apparatus for uniformly illuminating a desired object includes a light source for emitting light for illumination and a light transmission element through which light from the light source propagates. A plurality of light diffusing members are located on part of the surfaces of the light transmission element and has a refractive index different from that of the light transmission element. The light diffusing members diffuse and steer to the outside of the light transmission element the light propagating through the light transmission element.

It is therefore an object of the present invention to provide a light diffusing device which can cause, of the light coming into a light transmission element from a light source, only a component having a desired wavelength to be exclusively diffused at a desired location of the light transmission element and thereby routed to the outside.

It is another object of the present invention to provide a new illumination apparatus which, using the light diffusing device of the type described above, accomplishes a simple and mechanically rigid construction and operates with an even intensity distribution.

It is another object of the present invention to provide a generally improved light diffusing device and illumination apparatus using the light diffusing device.

Other objects, together with the foregoing, are attained in the embodiments described in the following description and illustrated in the accompanying drawings.

DESCRIPTION OF THE PREFERRED EMBODIMENTS

While the apparatus for uniform illumination employing a light diffuser of the present invention is susceptible of numerous physical embodiments, depending upon the environment and requirements of use, substantial numbers of the herein shown and described embodiments have been made, tested and used, and all have performed in an eminently satisfactory manner.

Figure 1:
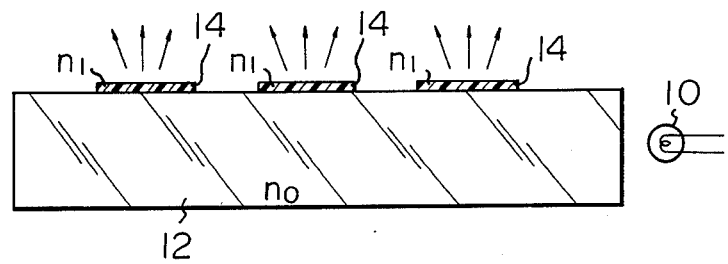
FIG. 1 is a view of a light diffusing device which illustrates the principle of operation a light diffusing device of the present invention.

Referring to FIG. 1, the principle of operation of a light diffusing device of the present invention is schematically illustrated. The reference numeral 10 designates a light source which may be a bulb, fluorescent lamp, laser, light emitting diodes (LED) or output end of a fiber optic bundle or the like. Light emitted from the light source 10 is incident on the adjacent end of a light transmission element 12 having a refractive index $n_0$. Typical examples of the light transmission element 12 may be quartz glass fibers, optical fibers made of plastics such as acrylic resin or polycarbonate resin, or fine tube or flat plate made up of such fibers. A light diffusing material, such as silicon resin or epoxy resin, is applied to a surface of the light transmission element 12 to form light diffusing layers 14. Each of these layers 14 has a refractive index $n_1$ different from that $n_0$ of the light transmission element 12. The refractive index $n_1$ is preselected such that its ratio to the refractive index $n_0$, $n_1/n_0$, lies within the range of about 0.87–1.3. Thus, light emitted from the light source 10 and conducted through the element 12 is routed to the outside through the respective light diffusing layers 14. It will be seen that a light component having any desired wavelength can be picked up through the diffusing layers 14 if the refractive index $n_1$ of the diffusing layers 14 is selected accordingly.

Figure 2:
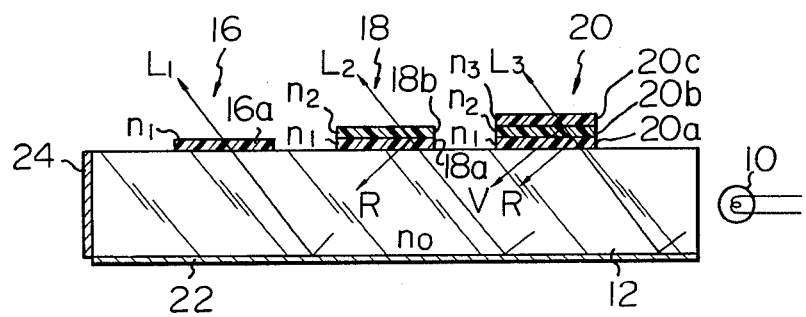
FIGS. 2 and 3 are views of first and second embodiments of the light diffuser embodying the present invention, respectively.

Referring to FIG. 2, a light diffuser embodying the present invention is shown and in which the same structural parts as those of FIG. 1 are designated by like reference numerals. The light diffuser comprises light diffusing sections 16, 18 and 20 arranged in succession on the light transmission element 12. The light diffusing section 16 is constituted by a single light diffusing layer 16a having a refractive index $n_1$. The light diffusing section 18 is made up of two light diffusing layers 18a and 18b having refractive indexes $n_1$ and $n_2$, respectively. The light diffusing section 20 is formed by three light diffusing sections 20a, 20b and 20c whose refractive indexes are $n_1$, $n_2$ and $n_3$, respectively. If the refractive indexes $n_1$, $n_2$ and $n_3$ of the respective layers are different from one another, light components of different wavelengths will come out through the respective light diffusing sections 16, 18 and 20. For example, the light diffusing section 16 may provide a light component $L_1$ necessary for illumination, the light diffusing section 18 a light component $L_2$ with thermic rays R removed by the diffusing layer 18b by reflection, and the light diffusing section 20 a light component $L_3$ with thermic rays R and ultraviolet rays V intercepted respectively by the diffusing layers 20b and 20c. It will be readily understood that where the light diffusing sections 16, 18 and 20 are carried on one side of the light transmission element 12, a reflecting layer 22 may be laid on the other side of the light transmission element 12 where the sections 16, 18 and 20 are absent. It will also be clear that where the light from the light source 10 enters the element 12 in parallel thereto, a reflecting layer 24 may be laid on the end of the element 12 opposite to the light input end.

Figure 3:
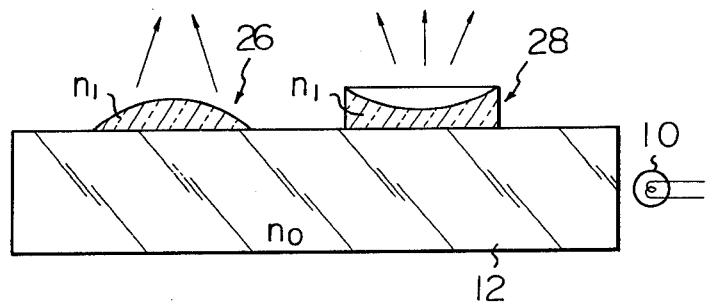
Figure 4:
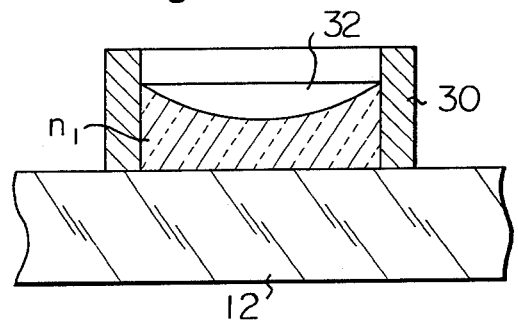
FIG. 4 is a view explanatory of a procedure for forming a concave lens-shaped light diffusing layer shown in FIG. 3.

Referring to FIG. 3, another embodiment of the light diffuser of the present invention is shown which employs generally lens-shaped light diffusing sections. A light diffusing section 26 is in the form of a convex lens having a refractive index $n_1$, while a light diffusing section 28 is in the form of a concave lens having the same refractive index $n_1$. Light, therefore, will be converged by the light diffusing section 26 and dispersed by the light diffusing section 28. The convex lens can be formed in a desired shape merely by dropping resin onto the light transmission element 12, the shape depending on the viscosity and surface tension of the resin, its contact angle with the light transmission element 12, etc. The concave lens, on the other hand, can be formed by the procedure generally demonstrated in FIG. 4. In FIG. 4, a suitable amount of resin with the refractive index $n_1$ is filled in a bore 32 of a masking film 30 and, after the resin has been hardened, the masking film 30 is removed to leave the concave lens on the light transmission element 12. The curvature of the concave lens depends on the surface tension of the resin, inside diameter of the masking film 30, etc. If desired, each light diffusing section may be formed by a plurality of convex or concave lenses laid one upon the other, as exemplified by the structure shown in FIG. 5.

Figure 5:
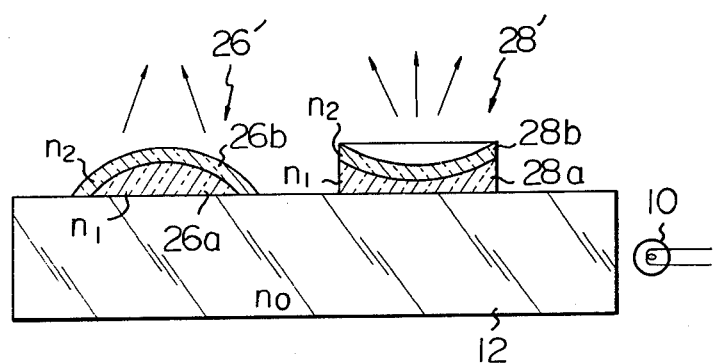
FIGS. 5 and 6 are views of a third embodiment of the present invention.
Figure 6:
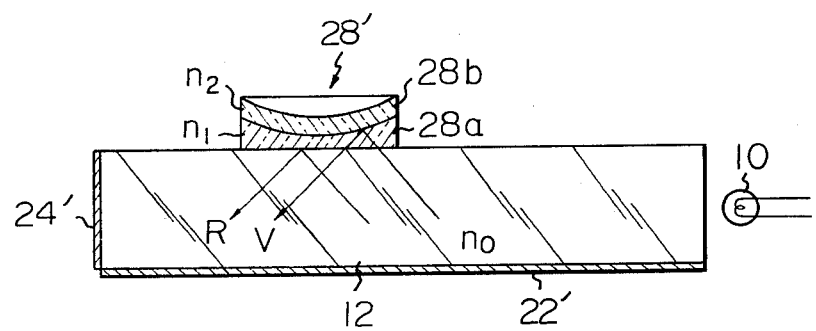
Figure 7:
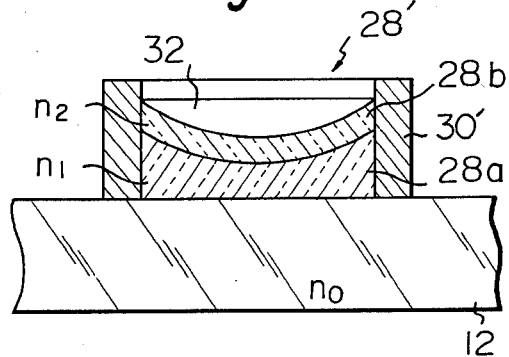
FIG. 7 is a view explanatory of a procedure for forming a concave lens-shaped double-layer light diffusing layer structure shown in FIG. 6.

Referring to FIG. 5, a light diffusing section 26' comprises a double-layer convex lens structure made up of two lenses 26a and 26b having different refractive indexes $n_1$ and $n_2$, respectively. Likewise, a light diffusing section 28' comprises a double-layer concave lens structure constituted by two lenses 28a and 28b whose refractive indexes are also $n_1$ and $n_2$, respectively. Stratifying a plurality of lenses of different refractive indexes in the manner shown and described will make it possible to pick up a component of a desired wavelength out of the light routed to the light diffusing section. For example, where visible light is emitted from the light source 10 to become incident on the light transmission element 12 which is provided with the double-layer concave structure 28' as shown in FIG. 6, the diffusing lens 28a reflects thermic rays R and the lens 28b intercepts ultraviolet rays V. Again, when the light diffusing sections are carried on one side of the light transmission element 12, a reflecting layer 22' may be laid on the other side where the light diffusing sections are absent; when the light from the light source 10 enters the light transmission element 12 in parallel thereto, a reflecting layer 24' may be laid on the end of the element 12 opposite to the light input end. FIG. 6 shows a procedure for forming the concave lens structure or diffusing section 28' on the light transmission element 12, which procedure is essentially similar to the procedure described with reference to FIG. 4. In FIG. 6, a suitable volume of resin 28a with the refractive index $n_1$ is charged and hardened in a bore 32' of a masking film 30', then a suitable amount of resin 28b with the refractive index $n_2$ is hardened on the first resin 28a, and finally the masking film 30' is removed. The curvature of the resulting concave lens structure is determined by the surface tension of the resin, the inside diameter of the masking film, etc.

It will thus be seen that the light diffuser in any one of the foregoing embodiments is capable of selectively discharging a light component having a specific wavelength at a desired position of a light transmission element. For example, light for illumination can be picked up with thermic rays separated therefrom. Such selective separation of light permits an object of illumination to be formed of a material which is rather poor in resistivity and stability to heat and the like though useful in optical function. This ensures a wider range of selection of materials for objects of illumination.

Now, audio and other acoustic instruments carry various kinds of indication plates and level meters which should be uniformly illuminated throughout their surfaces, due to the nature of such equipments. However, the source voltage presently available for an illumination device is supplied by the secondary winding of a transformer and not higher than about 12–24 V. This, coupled with the fact that a lamp serving as a light source cannot be large due to limitations in design and space, makes the intensity of illumination on the indication plates insufficient and uneven regardless of the illumination system, i.e. transmission type or reflection type. Moreover, in an illumination system using LED's or the like as a light source, a number of LED's are required to render the wiring intricate and the cost prohibitive.

Figure 8:
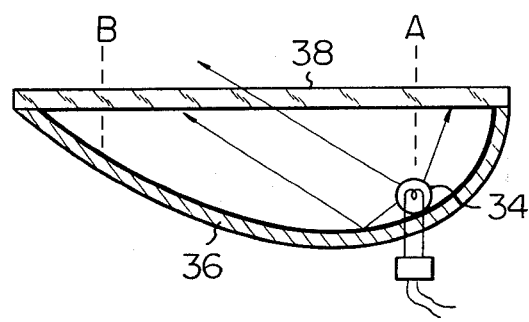
FIG. 8 is a view of an example of conventional apparatuses for uniform illumination.

In an automotive vehicle, on the other hand, various meters are arranged on an instrument panel in front of the driver's seat. These meters, particularly the speedometer, have to be illuminated to an even intensity distribution over the entire surfaces of their dials. FIG. 8 indicates a conventional automotive speedometer and its associated illuminating arrangement. Shown in FIG. 8 are a light source 34 in the form of a lamp, a reflector 36 in the form of a mirror, and a dial 38. As well known to the art, the distance between the reflector 36 and the dial 38 is made larger at a point A close to the lamp 34 than at a point B far from the lamp 34, in an effort to achieve an even distribution of intensities. The intensity, however, unavoidably drops in a position remote from the lamp 34 due to the nature particular to such a system, while a substantial space must be allocated in the aspect of structure. Furthermore, the speedometer of the kind concerned requires a disproportionate number of manufacturing steps as well as a disproportionate cost.

Figure 9:
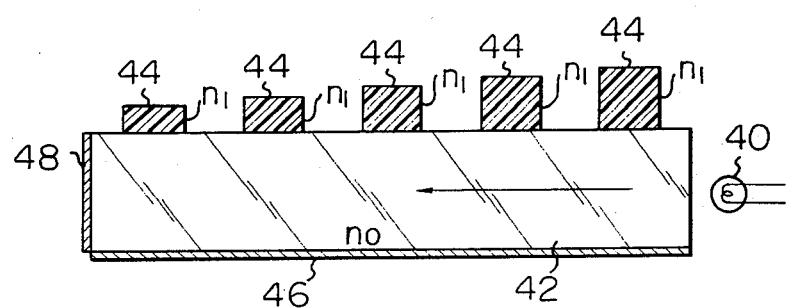
FIG. 9 is a sectional side elevation of an apparatus for uniform illumination equipped with a light diffuser of the present invention.
Figure 10:
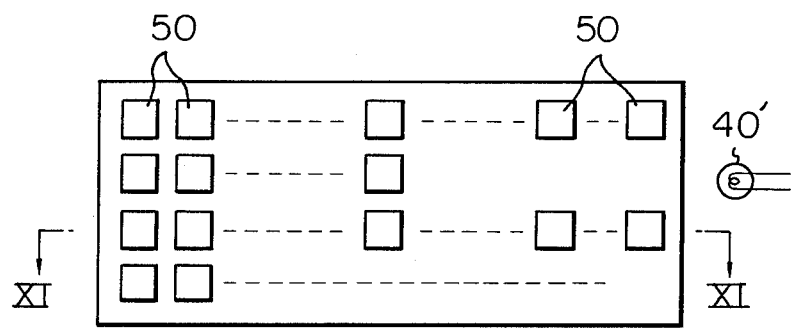
FIG. 10 is a schematic plan view of another embodiment of the uniform illumination apparatus with the light diffuser.
Figure 11:
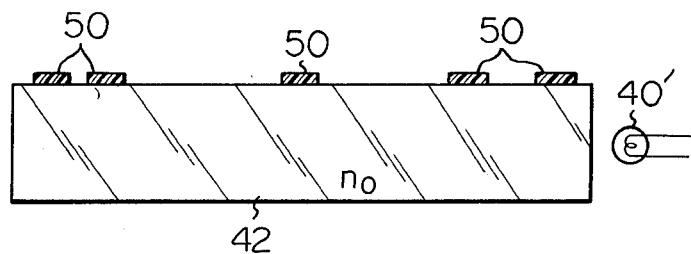
FIG. 11 is a section along line XI—XI of FIG. 10.

Referring to FIGS. 9–11, there are shown two different embodiments of the light diffuser of the present invention which are designed to serve as an illumination apparatus capable of eliminating all the drawbacks discussed above. In FIG. 9, the illumination apparatus comprises a light source 40 similar to the light source employed in the foregoing embodiments, a light transmission element 42 also similar to the one previously described, and a number of light diffusing layers 44 carried on the light transmission element 42. The refractive index $n_1$ of the diffusing layers 44 is chosen such that its ratio to the refractive index $n_0$ of the light transmission element 42 lies within the range of 0.87–0.95.

While light from the light source 40 enters the light transmission element 42 and propagates in the direction indicated by an arrow, it comes out through the respective diffusing layers 44 to illuminate a desired object. In this instance, the luminous flux density is high in the area adjacent to the light source 40 but progressively lowered toward the end of the element 42 remote from the light input end. As a result, the amount of discharged light naturally decreases in the area remote from the light source, disenabling uniform illumination to be accomplished. In light of this, the embodiment shown in FIG. 9 has a characteristic feature that the diffusing layers 44 are made progressively thinner from the one closest to the light source over to the one farthest from the same. Such a thickness distribution of the layers 44 is reflected by an amount of light attenuation which progressively decreases from the layer 44 closest to the light source over to the layer 44 farthest from the same, thereby setting up uniform illumination for a desired object. The back surface 46 and/or the end surface 48 of the light transmission element 42 may be constituted by a reflecting mirror surface in order to more effectively utilize the light incident on the element 42, as described in conjunction with the previous embodiments.

Referring to FIGS. 10 and 11, another embodiment of the present invention includes a plurality of light diffusing layers 50. These layers 50, different from the layers 44 shown in FIG. 9, are arranged to such a density which is lowest in a position closest to a light source 40' and made progressively higher toward a position farthest from the light source 40', though their thicknesses are common to each other. Illumination accomplished with the arrangement of the layers 50 is as even as that achievable with the layers 44.

Various modifications will become possible for those skilled in the art after receiving the teaching of the present disclosure without departing from the scope thereof.

What is claimed is:

1. A light diffusing device comprising:
    a light transmission element for transmitting light emitted from a light source; and
    a plurality of discrete light diffusing layers positioned at spaced locations on a surface of said light transmission element, each of said light diffusing layers diffusing and discharging to the outside of said light transmission element only light component having a specific wavelength which is contained in the light propagating through said light transmission element, at least one of said light diffusing layers having a convex lens configuration.

2. The light diffusing device as claimed in claim 1, in which the light transmission element is made of optical fibers.

3. The light diffusing device as claimed in claim 1, in which the light diffusing layers are made of epoxy resin.

4. The light diffusing device as claimed in claim 1, in which the light diffusing layers are made of silicon resin.

5. The light diffusing device as claimed in claim 1, in which at least one of the light diffusing layers has a flat configuration.

6. The light diffusing device as claimed in claim 1, in which at least one of the light diffusing layers comprises a single-layer structure having a refractive index different from a refractive index of the light transmission element.

7. The light diffusing device as claimed in claim 1, in which there holds a ratio $n_1/n_0 = 0.87$ to $1.3$ where $n_0$ is the refractive index of the light transmission element and $n_1$ the refractive index of the light diffusing element.

8. The light diffusing device as claimed in claim 1, in which at least one of the light diffusing layers comprises a multi-layer structure made up of a plurality of layers having refractive indexes different from each other.

9. The light diffusing device as claimed in claim 8, in which the plurality of layers are combined to form said convex lens configuration.

10. A light diffusing device comprising:
    a light transmission element for transmitting light emitted from a light source; and
    a plurality of discrete light diffusing layers positioned at spaced locations on a surface of said light transmission element, each of said light diffusing layers diffusing and discharging to the outside of said light transmission element only light component having a specific wavelength which is contained in the light propagating through said light transmission element, at least one of said light diffusing layers having a concave lens configuration.

11. The light diffusing device as claimed in claim 10, in which at least one of the light diffusing layers comprises a single-layer structure having a refractive index different from the refractive index of said light transmission element.

12. The light diffusing device as claimed in claim 10, in which at least one of the light diffusing layers comprises a multi-layer structure made up of a plurality of layers having refractive indexes different from each other.

13. The light diffusing device as claimed in claim 12, in which the plurality of light diffusing layers are combined to form said concave lens configuration.

14. An apparatus for uniformly illuminating a desired object comprising:
    a light source for emitting light for illumination;
    a light transmission element through which light emitted from said light source propagates; and
    a plurality of light diffusing members located on part of the surfaces of said light transmission element and having a refractive index different from that of said light transmission element, said light diffusing members diffusing and discharging to the outside of said light transmission element the light propagating through said light transmission element, said light diffusing members having thicknesses which are different from each other with the light diffusing member of largest thickness being closest to said light source and the light diffusing member of smallest thickness being farthest from said light source, said light diffusing members progressively decreasing in thickness in inverse proportion to the distance of the respective light diffusing member from said light source.

15. An apparatus for uniformly illuminating a desired object comprising:
   a light source for emitting light for illumination;
   a light transmission element through which light emitted from said light source propagates; and
   a plurality of light diffusing members located on part of the surfaces of said light transmission element and having a refractive index different from that of said light transmission element, said light diffusing members diffusing and discharging to the outside of said light transmission element the light propagating through said light transmission element, all of said light diffusing members having the same thickness, each of said light diffusing members having a density different from one another with the light diffusing member of least density being closest to said light source and the light diffusing member of greatest density being farthest from said light source, said light diffusing members progressively increasing in density in proportion to the distance of the respective light diffusing member from said light source.

* * * * *